(12) United States Patent
Bouchard et al.

(10) Patent No.: US 12,053,873 B2
(45) Date of Patent: Aug. 6, 2024

(54) MESH NETWORK OF RECONFIGURABLE ROBOTS

(71) Applicant: FLEXXBOTICS, Boston, MA (US)

(72) Inventors: Tyler M. Bouchard, Boston, MA (US); Tyler Modelski, Woburn, MA (US)

(73) Assignee: Flexxbotics, Windham, ME (US)

( * ) Notice: Subject to any disclaimer, the term of this patent is extended or adjusted under 35 U.S.C. 154(b) by 194 days.

(21) Appl. No.: 17/381,834

(22) Filed: Jul. 21, 2021

(65) Prior Publication Data

US 2022/0024047 A1 Jan. 27, 2022

Related U.S. Application Data

(60) Provisional application No. 63/055,258, filed on Jul. 22, 2020.

(51) Int. Cl.
*B25J 13/00* (2006.01)
*B25J 9/16* (2006.01)

(52) U.S. Cl.
CPC ........... *B25J 13/006* (2013.01); *B25J 9/1653* (2013.01); *B25J 9/1682* (2013.01)

(58) Field of Classification Search
CPC ....... B25J 13/006; B25J 9/1653; B25J 9/1682
See application file for complete search history.

(56) References Cited

U.S. PATENT DOCUMENTS

| | | | |
|---|---|---|---|
| 5,413,454 A | 5/1995 | Movsesian | |
| 6,463,360 B1 | 10/2002 | Terada et al. | |
| 9,599,990 B2 | 3/2017 | Halloran et al. | |
| 9,855,658 B2 * | 1/2018 | Babu | B25J 9/1694 |
| 10,052,763 B1 | 8/2018 | Nusser et al. | |
| 2007/0061041 A1 | 3/2007 | Zweig | |
| 2011/0257786 A1 | 10/2011 | L'Ecuyer et al. | |
| 2019/0275676 A1* | 9/2019 | Jensen | B25J 13/006 |
| 2020/0094411 A1* | 3/2020 | Tan | B25J 9/1661 |
| 2020/0230817 A1* | 7/2020 | Han, II | B25J 9/1661 |
| 2020/0306988 A1* | 10/2020 | Shaffer | G05B 19/4184 |
| 2021/0309404 A1* | 10/2021 | Werfring | B25J 9/0093 |

FOREIGN PATENT DOCUMENTS

| | | |
|---|---|---|
| EP | 1749249 A1 | 2/2007 |
| JP | 6535832 A2 | 7/2019 |
| KR | 1020060015557 A | 2/2006 |
| WO | 2005/059666 A1 | 6/2005 |
| WO | 2006133096 A3 | 5/2007 |

OTHER PUBLICATIONS

International Search Report, PCT/US2021/042565, Oct. 28, 2021, pp. 1-2.

* cited by examiner

*Primary Examiner* — Jonathan L Sample
*Assistant Examiner* — Mohammed Yousef Abuelhawa
(74) *Attorney, Agent, or Firm* — Armis IP Law, LLC

(57) ABSTRACT

A mesh network controller for a plurality of collaborative utility robots disposed around an industrial environment monitors and controls the utility robots for movement and redeployment around the industrial environment for engaging with industrial processes and receiving a process specific control program or instruction set for performing a utilization task required by the industrial process and gathering analytics from attached sensors. Upon completion or demand, the engaged utility robot may be reconfigured for receiving a different process specific instruction set for performing and data gathering of a different utilization task.

17 Claims, 6 Drawing Sheets

MESH NETWORK OF RECONFIGURABLE ROBOTS

RELATED APPLICATIONS

This patent application claims the benefit under 35 U.S.C. § 119(e) of U.S. Provisional Patent App. No. 63/055,258, filed Jul. 22, 2020 entitled "MESH NETWORK OF RECONFIGURABLE ROBOTS" incorporated herein by reference in entirety.

BACKGROUND

Robotics have become increasingly advanced in recent decades as technological advances in cost and accuracy allows viability for an increasing number of industrial processes involving repetitive actions. Large industrial robots have been in use for heavy equipment manufacturing, and typically involve fixed position, dedicated task machines that represent substantial capital investment. More recently, smaller, general purpose utility robots have emerged, which typically have a more universal manipulation capability that can be applied to multiple industrial tasks by reconfiguring and reprogramming the robot with instructions for performing the particular industrial process.

SUMMARY

A mesh network controller for a plurality of collaborative utility robots disposed around an industrial environment monitors and controls the utility robots for movement and redeployment around the industrial environment for engaging with industrial processes and receiving a process specific control program or instruction set for performing a utilization task required by the industrial process. Upon completion or demand, the engaged utility robot may be transported to another utility process and engaged for receiving a different process specific instruction set for the now-engaged process. In this manner, a relatively smaller number of utility robots may be disposed and redeployed around an industrial environment for tending to processes that may not require a full time deployment of a dedicated utility robot.

Configurations herein are based, in part, on the observation that utility robots, such as a so-called 6-axis robot of about 30-60 pounds are sufficiently portable to be transported around an industrial environment such as a factory or operation floor in order to tend to multiple processes on a rotating or periodic, on demand, basis. These robots may be referred to as collaborative robots, and the approach herein is applicable to any suitable type of industrial robot based on the type of program to be commenced and executed for fulfilling a utilization task.

Unfortunately, conventional utility robots suffer from the shortcoming that reconfiguration is required for each new process that the utility robot is engaged with. Such a redeployment involves disengaging the utility robot from a current process, and manually performing a reconfiguration and upload of a program defining a new process specific instruction set for the subsequent task, followed by movement and engagement of the reprogrammed utility robot with the subsequent task. Substantial downtime is therefore required for each additional process for which the utility robot is to undertake.

Accordingly, configurations herein substantially overcome the above-described shortcoming of conventional utility robot deployment by providing a network controller and method for maintaining a mesh network of beacons covering an industrial environment of utility robots, each reconfigurable and reprogrammable by the network controller (hub) for identifying a robot nearest and/or available for the industrial process, and transmitting process specific instructions for performing the newly deployed task. The process specific instructions may take any suitable form, such as a script, object code, command mapping, or other suitable form for depicting the specific steps, configurations, movements and operations to be performed by the utility robot for completing the particular utilization task defining the industrial process for completion. Each industrial process involves a set of process specific instructions for completing the corresponding industrial process, and may be termed a task specific instruction set, control program, or other suitable label.

In a particular configuration depicted below, an industrial environment employs collaborative utility robots for performing these utilization tasks. A network controller, or server, establishes a mesh network of beacons spaced around the industrial environment and is conversant using a mesh network protocol such as WiFi, Bluetooth, Thread or Zigbee. Each may be supported by a local computing device suitable in size and power and having an appropriate interface capability may be employed. The network controller provides for reconfigurable utility robot deployment for a plurality of industrial processes responsive to robotic control, using an array of beacons disposed around the industrial environment to provide a wireless interface to each robot and supporting machines and sensors. The hub couples to each of the beacons in the array of beacons via the mesh network, in which the hub is operable to direct a set of instruction messages for each of the utilization tasks.

In further detail, a method of operating a collaborative robot as defined herein includes identifying a work cell including a robot and optional peripherals, such that the peripherals are associated with a utilization task performable by the robot. The hub identifies a program for performing the utilization task, and identifies a configuration corresponding to the identified program. The hub sends, via the mesh network, a command to the robot for establishing the configuration corresponding to the identified program and for invoking the program for commencing the utilization task. Alternatively, the program may perform configuration of the robot for performing the utilization task; any suitable arrangement of messages may be employed for performing the configuration and program invocation.

In contrast to conventional approaches, when a subsequent task arises, the hub identifies a successive program for performing a successive utilization task, and invokes the successive program to configure the robot for performing the successive utilization task, in which the successive utilization task invokes a different robotic configuration than the utilization task. Mobile robots may also be directed to a different position via the reconfiguration, however downtime for manual reconfiguration is not needed.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example of an industrial environment includes a plurality of work cells for performing a function or purpose by a robot and associated sensors and/or machines that complement a utilization task performed by the robot.

Figure 1:
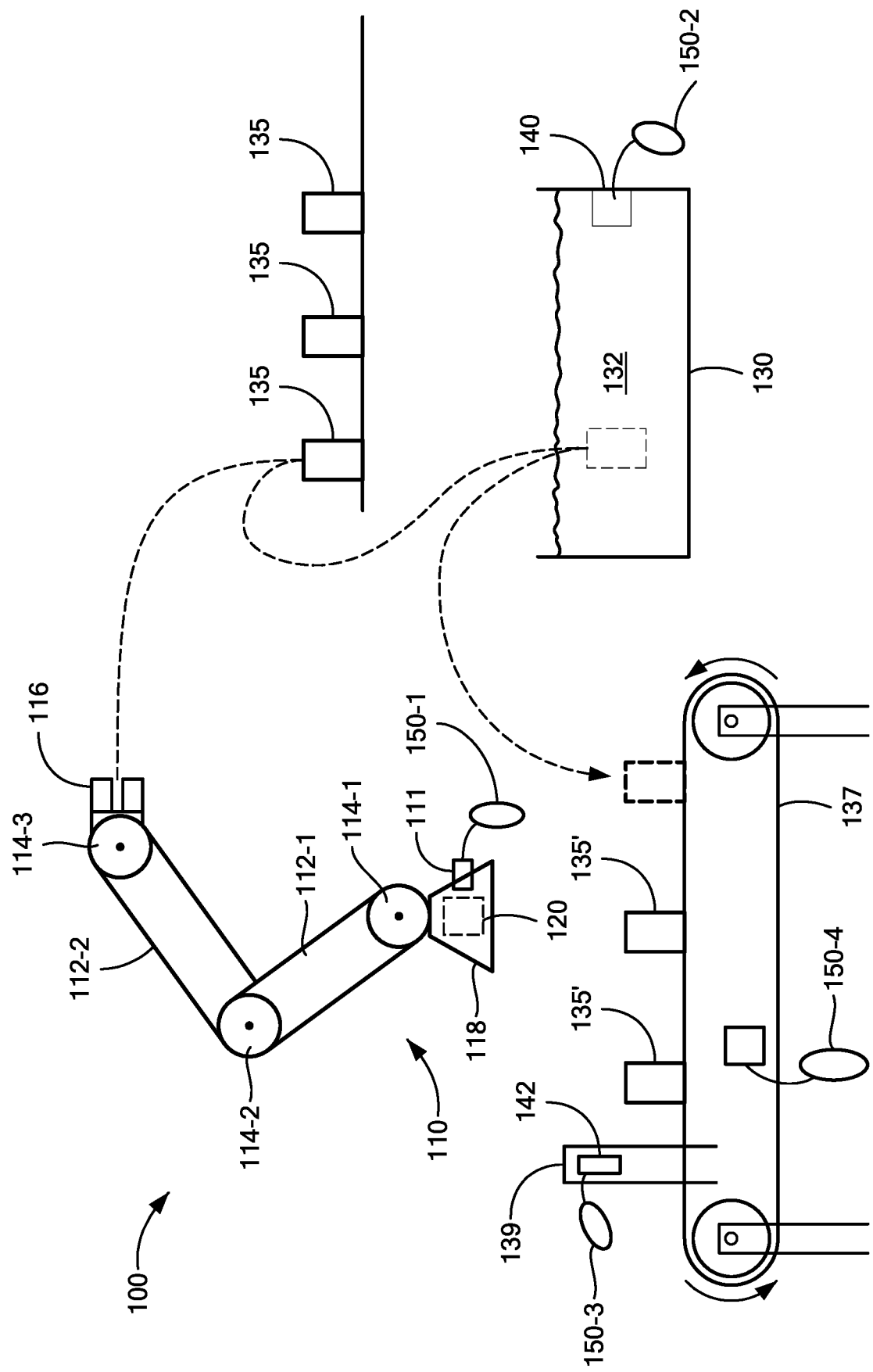
FIG. 1 is a context diagram of a collaborative robot environment suitable for use with configurations herein.

FIG. 1 is a context diagram of a collaborative robot environment suitable for use with configurations herein. In an industrial environment 100, multiple robots 110 performs utilization tasks such as manufacturing, material control, hazardous handling, stocking/packaging and the like. The robots 110 may be industrial robots such as six axis collaborative robots, and are conversant in a mesh network in a medium such as Bluetooth®. The example robot 110 has arms 112-1 . . . 112-2 (112 generally) connected by pivot points 114-1 . . . 114-3 (114 generally) to an actuator 116 or end-effector such as a claw or tool, all supported on a rotating base 118. The base 118 includes a controller 120 responsive to an interface port 111 such as a USB or similar receptacle.

As indicated above, the robot 110 is suited to a variety of tasks limited only by its programming and reach. An example task might be to engage or grip manufactured objects 135, dip them in a bath 130 filled with coating fluid 132, and deposit the coated objects 135' on a conveyor 137 for transport through an optical scanner 139 for counting or quality control.

Configurations herein accommodate machines and sensors that complement the utilization task performed by the robots. For example, a temperature sensor 140 might monitor the temperature of the coating fluid 132, and an optical scanner 142 might count the coated object 135' passing off the conveyor. The mesh network supports an arrangement of beacons 150-1 . . . 150-4 (150 generally) which may be inserted or affixed to the robot 110 and sensors 140, 142. Similarly, the conveyor 137 may receive an attached beacon 150-4 for machine control via the mesh network. Each beacon 150 includes a mesh network antenna and interface such as a USB interface 111 for insertion or attachment to a constituent robot, sensor or machine.

Figure 2:
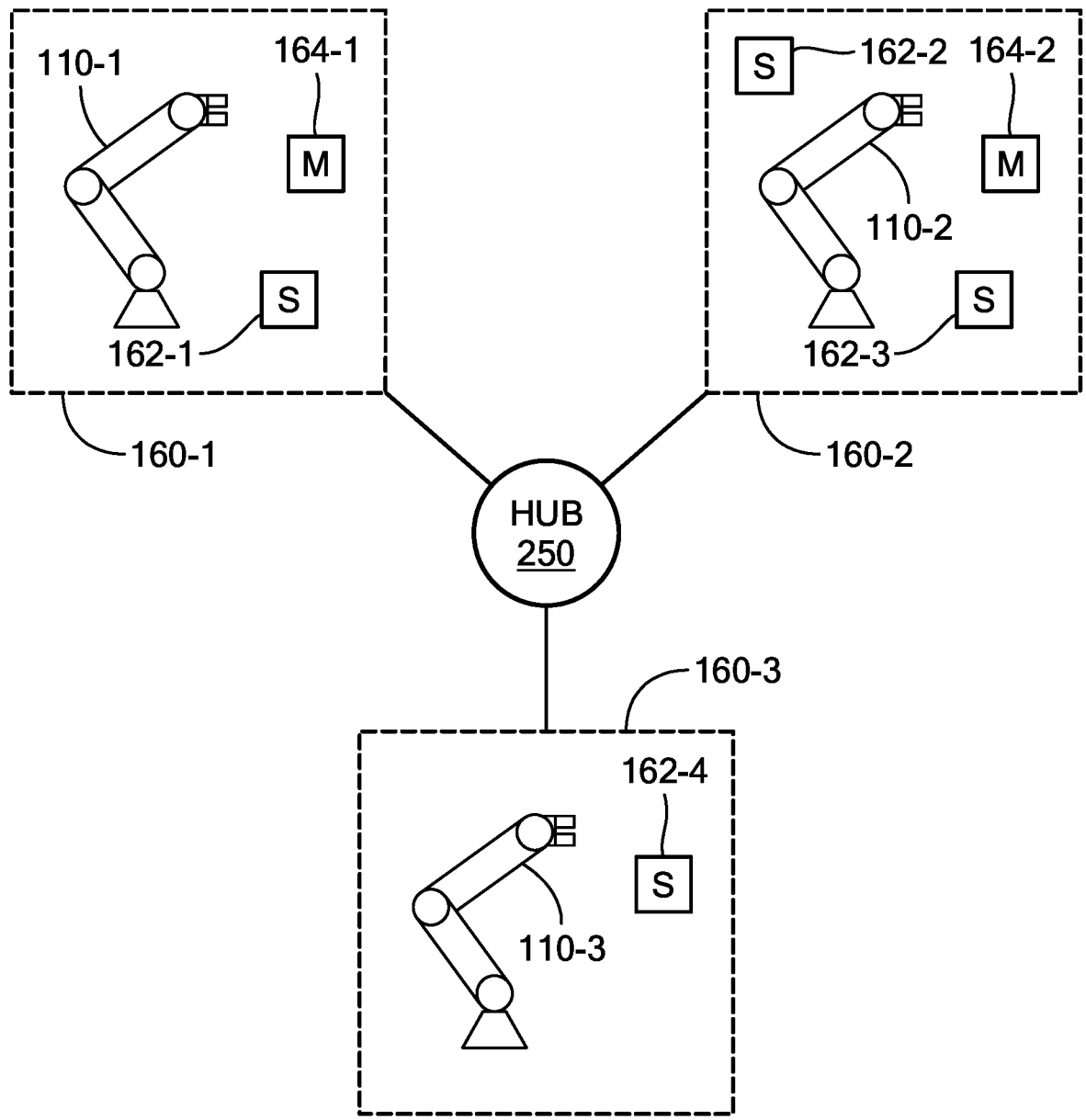
FIG. 2 is a block diagram of a plurality of robots in the environment of FIG. 1.

FIG. 2 is a block diagram of a plurality of robots in the environment of FIG. 1. The industrial environment 100 may include a plurality of robots, each receptive to a program for performing a utilization task. The method of operating a robot as defined herein, includes identifying a work cell 160-1 . . . 160-3 (160 generally), each including at least one robot 110-1 . . . 110-3 (110 generally) and any number of sensors 162-1 . . . 162-4 (162 generally) or machines 164-1 . . . 164-2 (164 generally), collectively peripherals, associated with a utilization task performable by the robot. Each of the robots, machines and sensors has a beacon 150 in communication with a hub 250 for receiving commands and/or returning data.

In the industrial environment 110, an arrangement of multiple work cells 160, each having a set of robots, sensors and machines for performing a utilization task, configuration and execution of a program on each robot presents a cumbersome arrangement. Similarly, gathering feedback and analytics from associated sensors 162 generates substantial amounts of data for correlation with robotic operation. The hub 250, in mesh network communication with the beacons 150 connected to each robot and peripheral, streamlines and focuses the startup, control, and data gathering, as described further in FIG. 3.

Figure 3:
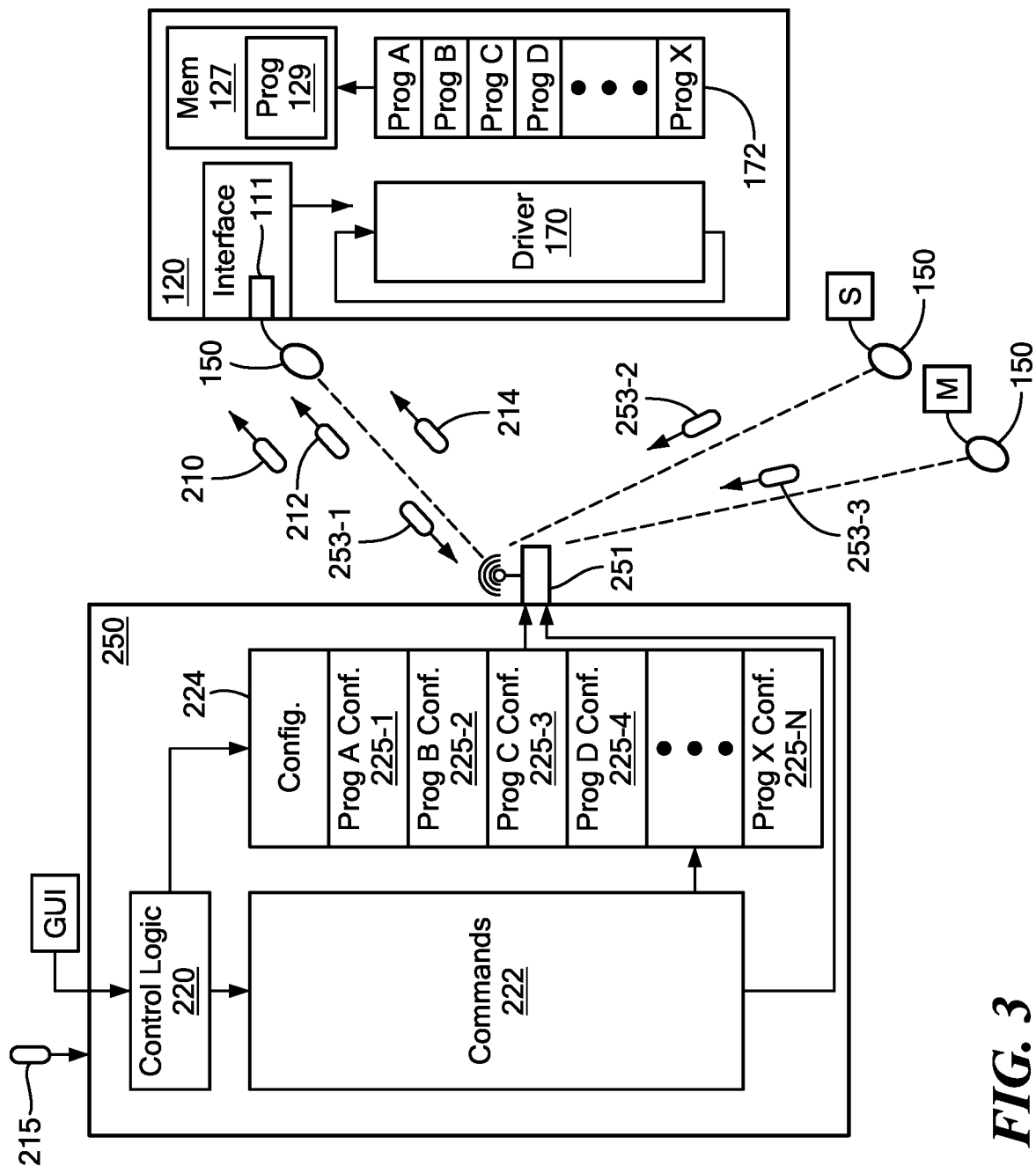
FIG. 3 is a data flow diagram of robot configuration and operation in the environment of FIG. 1.

FIG. 3 is a data flow diagram of robot configuration and operation in the environment of FIG. 1. Referring to FIGS. 1-3, the hub 250 is shown in communication with the controller 130 for an example robot 150 in a work cell. The hub 250 is operable to communicate with and control a plurality of work cells 150 and robots 150 in the industrial area 100.

Each of the robots 110 includes a controller 120 coupled to the beacon 150 via an interface 111. The beacon 150 may be a dongle adapted to engage a USB port or similar connection. Each peripheral also has a beacon 150 connection, typically a USB (Uniform Serial Bus) or other serial connection. During startup, the hub 250 receives proximity signals from the plurality of robots 110 and peripherals, and identifies, based on the proximity signals, an identity of a work cell corresponding to each of the robots and the peripherals. Work cells 160 may be determined by identifiers, signal proximity or other suitable arrangement; multiple work cells may be supported by a hub, or alternatively only a single work cell. Whatever the arrangement, the hub 250 receives a proximity signal from each of the beacons 150 corresponding to the work cells. The proximity signal from the robot 110 includes an advertisement packet, shown in FIG. 4A below, for reconciling robots and utilization tasks.

For the robot 110 to perform a utilization task, it needs a driver 210, configuration 212, and program command 214 corresponding to the utilization task. Once operational according to the program, the hub may send additional commands to actuate the machines 164 in the work cell, and may receive the data stream from the sensors 162 for subsequent analytics. Before the hub can direct the robot, 110, it transmits the driver 210, which iterates in a control loop 170 in the controller 120 for receiving command messages 214 and configuration messages 212. The hub 250 includes an antenna 251 for transmission to and from the beacons 150. The hub 250 commences, at each of the robots 110, the driver 210 for maintaining communication with the hub 250.

The hub 250 receives an indication 215 of a utilization task for performance via a GUI (Graphical User Interface) or other suitable mechanism. Within the hub 250, control logic 220 employs a set of commands 222 recognized by the robot controller 120. These commands may be vendor specific; an example set is shown in FIG. 4B.

The hub 250 also includes a set of configurations 224 associated with the various utilization tasks that the robot 110 may be invoked to perform. Each controller 120 also includes a set of programs 124 for the utilization tasks. To commence a utilization task, the control logic 220 identifies a work cell associated with the robot 110 for performing the task, then identifies a configuration 225-1 . . . 225-N (225 generally) corresponding to the utilization task performed by the robot. Configuration generally includes positioning the robot and setting parameters, movement ranges and any other initialization aspects that are expected by the program to be launched. Each utilization task has a respective program 172 and a corresponding configuration 225 to properly set up and initialize the robot for the utilization task. The hub 250 identifies a program for performing the utilization task, and identifies the configuration corresponding to the identified program. It then sends a set of configuration commands 212 for configuring the robot according to the identified configuration. Following completion of the configuration commands, the hub 250 sends a command 214 for invoking the program. The command 214 references a program in the set 172 of programs, and the corresponding program is loaded into a memory 127 as a current program 129.

Any suitable combination of commands for configuration and program invocation may be performed to establish the configuration corresponding to the program that performs the utilization task. For example, the program itself may perform configuration of the robot for performing the utilization task, however typically the configuration is established prior to program execution. Advantages of the disclosed approach include directing the configuration based on the utilization task, such that the hub 250 may identify a successive program for performing a successive utilization task. The hub 260 invokes the successive program to configure the robot 110 for performing the successive utilization task, in which the successive utilization task invokes a different robotic configuration than the initial utilization task. Any number of programs having different configurations may therefore be invoked by selecting different utilization tasks, and invoking the corresponding configuration and program.

Figure 4A:
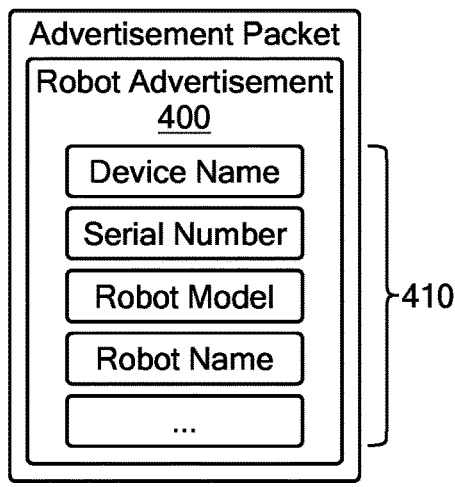
FIG. 4A is an information packet included in a proximity signal from the robots in FIGS. 1-3.
Figure 4B:
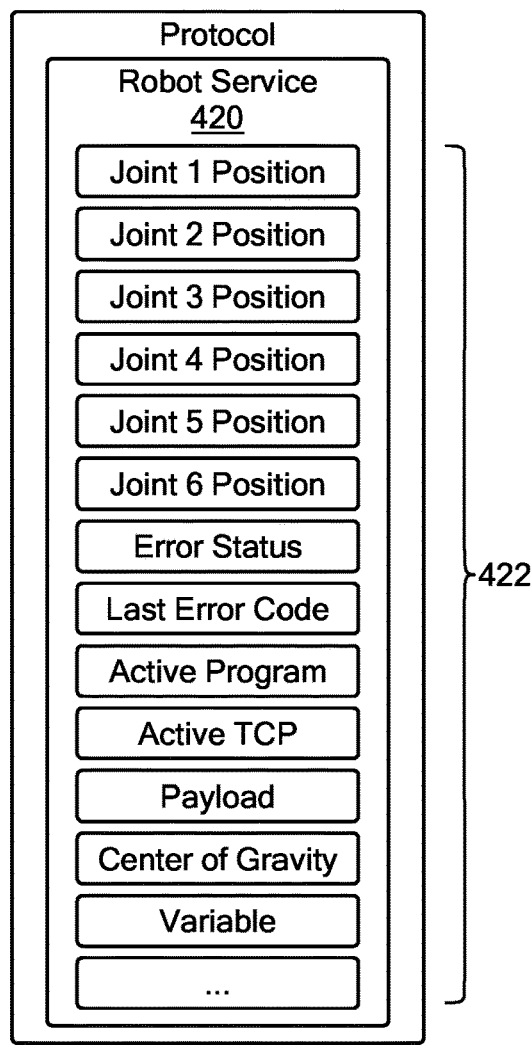
FIG. 4B is an example of a command packet sent to a robot in the configuration of FIGS. 1-3.

FIG. 4A is an information packet included in a proximity signal from the robots in FIGS. 1-3. The proximity signal 253-1 ... 253-2 (253 generally) includes an advertisement 400 from each robot 110 that includes robot specific fields 410, such as model and serial number. The hub 250 identifies the work cells and robots contained therein based on the advertisement 400 sent from the beacons 150.

FIG. 4B is an example of a command 214 packet sent to a robot in the configuration of FIGS. 1-3. Each command 214 directs a robot service, and includes one or more robotic control fields 422 and associated parameters. As indicated above, command fields 422 are vendor specific and based on a script, syntax or language published by the robot vendor. Accordingly, a vendor selection and/or mapping may also be involved.

Figure 5:
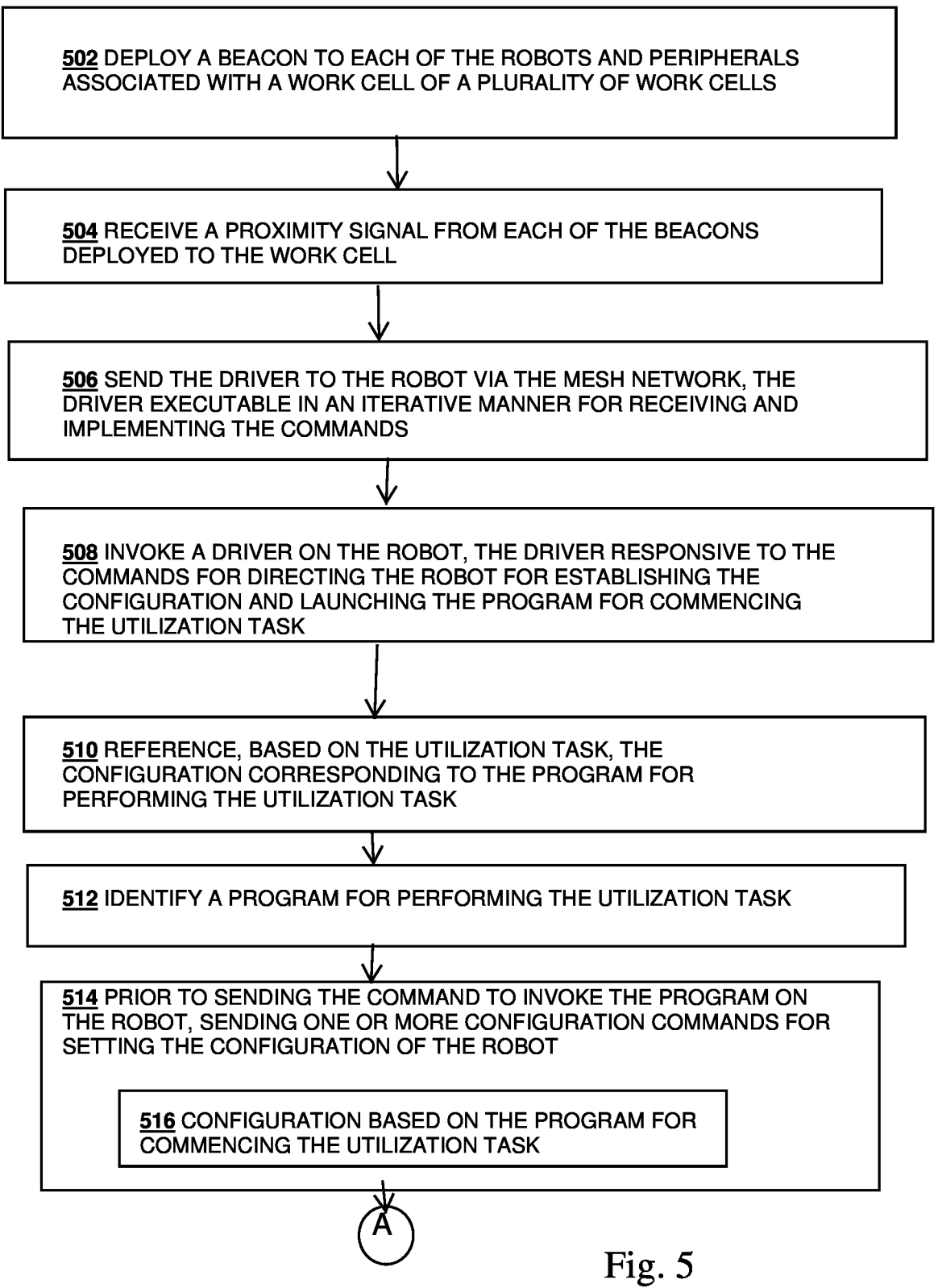
FIG. 5 is a flowchart of robotic configuration and operation in the configurations of FIGS. 1-3.
Figure 5:
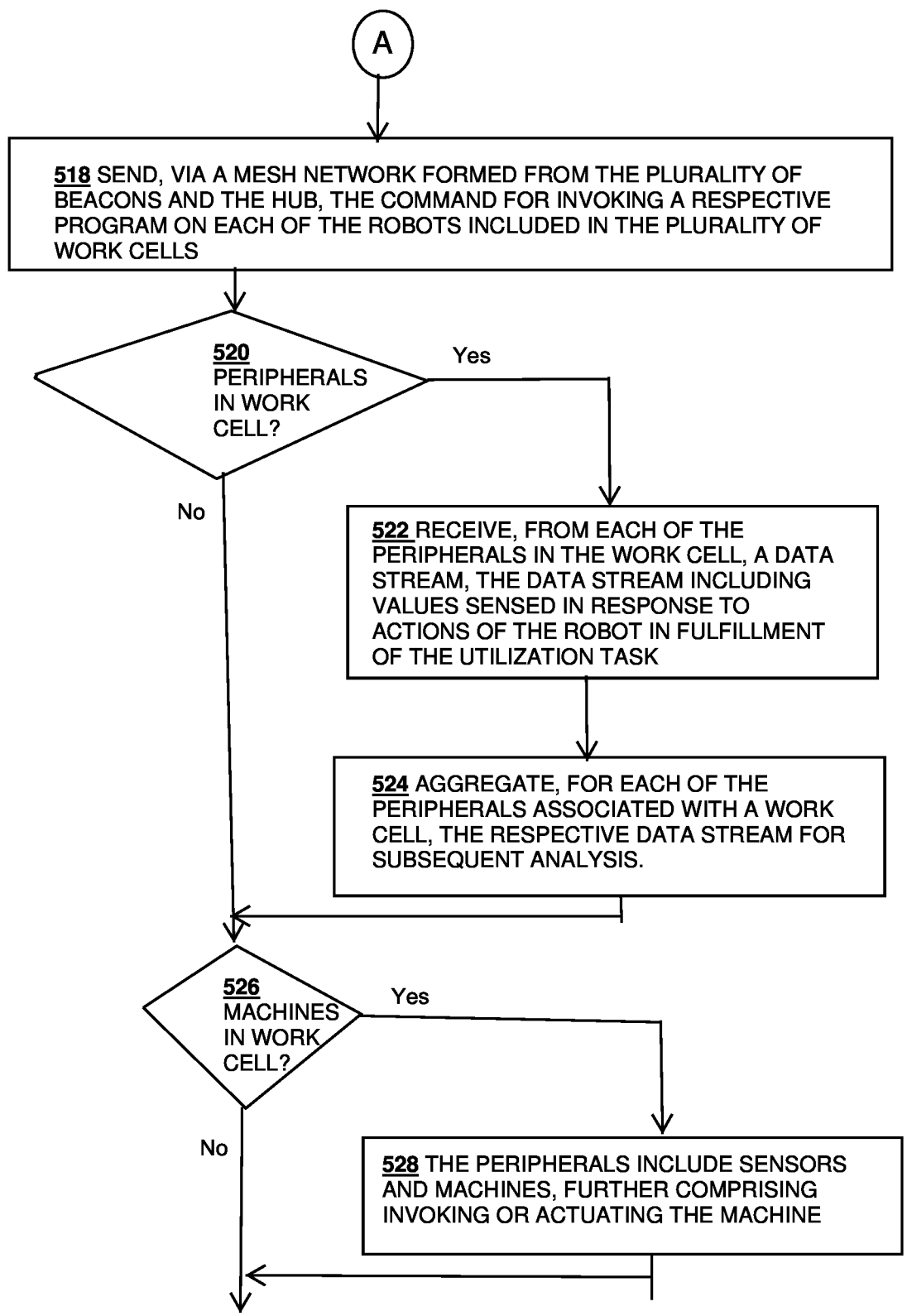

FIG. 5 is a flowchart 500 of robotic configuration and operation in the configurations of FIGS. 1-3. Referring to FIGS. 1-5, in the system and devices described above, the control logic 220 in the hub 250 implements a sequence of steps which commences with deploying a beacon to each of the robots and peripherals associated with a work cell of a plurality of work cells, as depicted at step 502. The hub 250 receives a proximity signal 253 from each of the beacons 150 deployed to the work cell 160, as shown at step 504. Having established the work cells and included peripherals, the hub 250 sends or stores the driver 210 to the robot 110 via the mesh network. The driver executes in an iterative manner for receiving and implementing the commands, as depicted at step 506.

The hub 250 invokes the driver on the robot 150, such that the driver 210 is responsive in a control loop 170 to the commands 214 for directing the robot 150 for establishing the configuration. The robot 110 launches the program from the program set 172 for commencing the utilization task, as disclosed at step 508. The driver executes in a loop for receiving the configuration 212 and related commands and for receiving the command 214 to invoke or launch the correct program from the set of programs 172. Once launched, the program will generally perform the utilization task until a successive command 214 terminates the program for reconfiguration for a different program.

The hub references, based on the utilization task, the configuration corresponding to the program for performing the utilization task, as depicted at step 510. The configurations are stored in a plurality of entries 255-1 ... 255-N (255 generally) in the set of configurations 224, such as a file or table. Each configuration 255 establishes a configuration for a corresponding program from the program set 172 at the robot 150. Generally, the robots 150 store the programs 172 they might be called upon to launch. The hub 250 also identifies a program for performing the utilization task, as depicted at step 512. Prior to sending the command 214 to invoke the program on the robot, the hub 250 sends one or more configuration commands 212 for setting the configuration of the robot, shown at step 514, in which the configuration is based on the program for commencing the utilization task, as disclosed at step 516.

Having configured the robot 150, the hub 250 sends the command for invoking the respective program via the mesh network formed from the plurality of beacons and the hub, as depicted at step 518. This occurs for each work cell 160 and robot 150 in the environment 100.

A check is performed, at step 520, to identify any peripherals in the work cell 160, such as sensors or data gathering elements or entities. Peripherals can be identified by the advertisement (proximity) messages 253. If so, then the hub 250 receives, from each of the sensors or other peripherals in the work cell, a data stream, such that the data stream includes values sensed in response to actions of the robot in fulfillment of the utilization task, as disclosed at step 522. As the sensors collect data, the hub 250 aggregates, for each of the peripherals associated with a work cell, the respective data stream for subsequent analysis, as depicted at step 524. When collected over time, the data may be invoked for analytics for evaluating the robotic process, efficiency of the utilization task performed, or other suitable analysis.

A further check is performed, at step 526, for beacons associated with machines in the work cell 160. If so, the hub 250 may invoke and control any machines in the work cell, as depicted at step 528. For example, based on sensor provided data, the hub 250 may command the machine to start and stop to avoid overfilling or overwhelming a downstream operation.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of operating a robot, comprising:
   identifying at least one work cell of a plurality of work cells by receiving proximity signals from a plurality of robots and peripherals, each work cell including at least one robot and zero or more corresponding peripherals, the at least one robot and zero or more peripherals associated with a utilization task performable by the robot, identifying the work cell further comprising:
      deploying a beacon to each of the robots and the peripherals associated with a work cell of a plurality of work cells; and
      receiving, at a hub, a proximity signal from each of the beacons deployed to the work cell;
   identifying a program for performing the utilization task;
   identifying a configuration corresponding to the identified program; and
   sending, via a mesh network formed from the plurality of beacons and the hub, a command to the robot for establishing the configuration corresponding to the identified program in response to the proximity signal, and for invoking the program for commencing the utilization task;
   receiving an indication of completing the utilization task for establishing a separate configuration;
   identifying a successive program for performing a successive utilization task; and
   invoking a corresponding successive configuration to configure the robot for performing the successive utilization task, the successive utilization task invoking a different robotic configuration than the utilization task.

2. The method of claim 1 further comprising, prior to sending the command to invoke the program on the robot, sending one or more configuration commands for setting the configuration of the robot, the configuration based on the program for commencing the utilization task.

3. The method of claim 1 further comprising:
   invoking a driver on the robot, the driver responsive to the commands for directing the robot for establishing the configuration and launching the program for commencing the utilization task.

4. The method of claim 3 further comprising:
   sending the driver to the robot via the mesh network, the driver executable in an iterative manner for receiving and implementing the commands; and
   referencing, based on the utilization task, the configuration corresponding to the program for performing the utilization task.

5. The method of claim 1 further comprising:
   receiving, from each of the peripherals in the work cell, a data stream, the data stream including values sensed in response to actions of the robot in fulfillment of the utilization task; and
   aggregating, for each of the peripherals associated with a work cell, the respective data stream for subsequent analysis.

6. The method of claim 5 wherein the peripherals include sensors and machines, further comprising receiving the data stream from the sensors; and sending, to the machines included in the work cell, commands to actuate the machine.

7. The method of claim 1 further comprising, for each of a plurality of robots,
   identifying a work cell associated with the robot;
   identifying a configuration corresponding to the utilization task performed by the robot;
   sending a set of configuration commands for configuring the robot according to the identified configuration; and
   following completion of the configuration commands, sending the command for invoking the program.

8. The method of claim 7 further comprising identifying a set of commands, each robot of the plurality of robots responsive to the commands;
   receiving, from each of the robots, an advertisement indicative of an identity of the robot;
   commencing, at each of the robots, a driver for maintaining communication with a hub;
   sending, from the hub, the hub in communication with a respective robot via the mesh network, one or more of the commands from the set of commands to the robot based on the identity of the robot.

9. The method of claim 8 wherein robots are six axis industrial robots conversant in a Bluetooth mesh network, and the beacons have a USB interface and an antenna, the USB interface in communication with the robot and the antenna in communication with the hub for receiving the commands.

10. A robotic controller, comprising:
    control logic for identifying a work cell of a plurality of work cells, each work cell including at least one robot and zero or more peripherals, the at least one robot and the zero or more peripherals associated with a utilization task performable by the robot in the identified work cell, identifying the work cell further comprising:
       deploying a beacon to each of the robots and the peripherals associated with each work cell of the plurality of work cells; and
       receiving, at a hub, a proximity signal from each of the beacons in the identified work cell;
    an interface for identifying a plurality of programs for performing a respective utilization task;
    a table for identifying a respective configuration corresponding to each of the identified programs; and
    an antenna interface configured to:
       receive the proximity signals from each of the beacons;
       identify, based on the proximity signals, an identity of a respective work cell corresponding to each of the robots and the peripherals; and
       send, via a mesh network formed from the plurality of beacons and the hub, a command to the robot for establishing the configuration corresponding to the identified program in response to the proximity signal, and for invoking the program for commencing the utilization task;
    the control logic further configured to:
       identify a successive program for performing a successive utilization task; and
       send a successive command for setting the configuration of the robot to perform the successive utilization task, the configuration based on the table.

11. The device of claim 10 wherein the control logic is further operable to:
    receive, from each of the peripherals in the work cell, a data stream, the data stream including values sensed in response to actions of the robot in fulfillment of the utilization task; and aggregate, for each of the peripherals associated with a work cell, the respective data stream for subsequent analysis.

12. The device of claim 10 wherein the control logic is further configured to:
   identify a table of set of commands, each robot of the plurality of robots responsive to the commands;
   receive, from each of the robots, an advertisement indicative of an identity of the robot;
   commence, at each of the robots, a driver for maintaining communication with a hub; and
   send, from the hub, the hub in communication with each of the robots via the mesh network, one or more of the commands from the set of commands to the robot based on the identity of the robot.

13. The device of claim 10 wherein the control logic is disposed in a six axis industrial robots conversant in a Bluetooth mesh network with beacons having a USB interface and an antenna.

14. A computer program embodying program code on a non-transitory medium that, when executed by a processor, performs steps for implementing a method for configuring and operating a robot, the method comprising:
   identifying at least one work cell of a plurality of work cells, by receiving proximity signals from a plurality of robots and peripherals, each work cell including at least one robot and zero or more corresponding peripherals, the at least one robot and zero or more corresponding peripherals associated with a utilization task performable by the robot,
   identifying the work cell further comprising:
      deploying a beacon to each of the robots and the peripherals associated with a work cell of a plurality of work cells; and
      receiving, at a hub, a proximity signal from each of the beacons deployed to the work cell;
   identifying a program for performing the utilization task;
   identifying a configuration corresponding to the identified program; and
   sending, via a mesh network formed from the plurality of beacons and the hub, a command to the robot for establishing the configuration corresponding to the identified program in response to the proximity signal and for invoking the program for commencing the utilization task;
   receiving an indication of completing the utilization task for establishing a separate configuration;
   identifying a successive program for performing a successive utilization task; and
   invoking a corresponding successive configuration to configure the robot for performing the successive utilization task, the successive utilization task invoking a different robotic configuration than the utilization task.

15. The method of claim 1 wherein the program corresponding to the configuration defines a peripheral directed by the robot and invoked for completion of the corresponding task.

16. The method of claim 1 further comprising:
   prior to sending the command establishing the configuration for the utilization task, programming the robot with instruction for performing the task using the respective configuration.

17. The method of claim 16, wherein the identified configuration sent via the network is based on the programming previously established.

* * * * *